(No Model.)
C. POLLAK.
APPARATUS FOR TRANSFORMING ALTERNATING CURRENTS INTO UNI-DIRECTIONAL CURRENTS.
No. 552,260.  Patented Dec. 31, 1895.
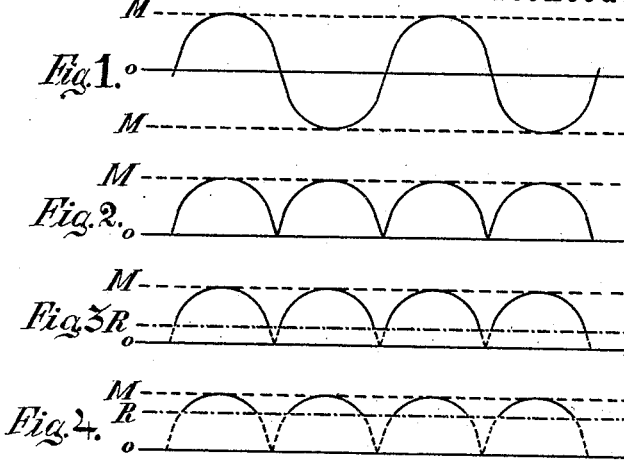
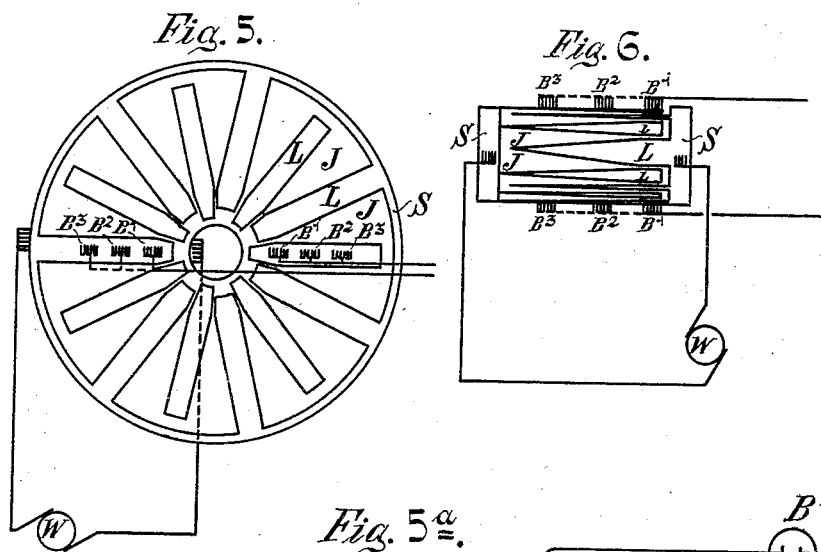
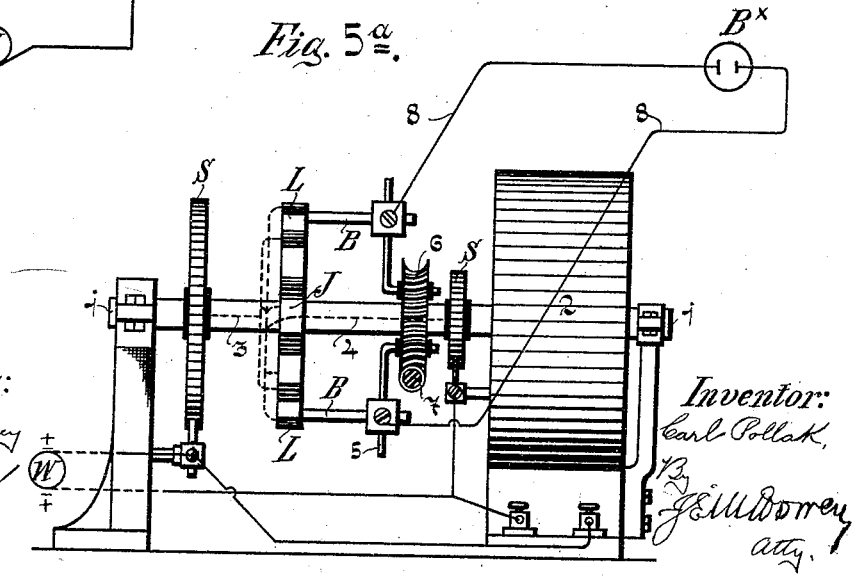
Witnesses:
M. C. Pinckney
W. E. Bowen
Inventor:
Carl Pollak,
J. E. M. Bowen
atty.

UNITED STATES PATENT OFFICE.

CARL POLLAK, OF FRANKFORT-ON-THE-MAIN, GERMANY.

APPARATUS FOR TRANSFORMING ALTERNATING CURRENTS INTO UNIDIRECTIONAL CURRENTS.

SPECIFICATION forming part of Letters Patent No. 552,260, dated December 31, 1895.

Application filed May 22, 1893. Serial No. 475,144. (No model.) Patented in France October 28, 1892, No. 225,265; in England November 2, 1892, No. 19,729; in Switzerland May 26, 1893, No. 7,059; in Austria April 3, 1894, No. 66,108, and in Hungary April 3, 1894, No. 3,318.

*To all whom it may concern:*

Be it known that I, CARL POLLAK, a subject of the Emperor of Austria-Hungary, residing at Frankfort-on-the-Main, Prussia, Germany, have invented certain new and useful Improvements in Apparatus for Transforming Alternating Currents into Unidirectional Currents, (for which I have obtained Letters Patent as follows: in France, No. 225,265, dated October 28, 1892; in Great Britain, No. 19,729, dated November 2, 1892; in Austria, No. 66,108, dated April 3, 1894; in Hungary, No. 3,318, dated April 3, 1894, and in Switzerland, No. 7,059, dated May 26, 1893,) of which the following is a specification.

This invention relates mainly to apparatus by which electric currents from alternating-current machines can be utilized to operate electric devices which require straight or unidirectional currents. Prior to my invention an apparatus for this purpose has been proposed, consisting of a straight-current generator driven by an alternating-current motor, the latter being in the circuit of the alternating-current generator. This apparatus is expensive, bulky, and wasteful of current. I propose to utilize alternating currents for the purposes mentioned, without such transformers as above described, but by the use merely of commutating devices for straightening the currents, as hereinafter set forth.

If, in an alternating-current circuit, a commutator is interposed which runs synchronously with the generator in said circuit, a direct pulsating current is obtained which ranges from zero to a maximum voltage, which maximum depends on the construction of the machine. Such current can be used for many purposes requiring direct current. It is not, however, adapted for charging storage-batteries or for the operation of continuous-current motors or other devices having a substantial counter electromotive force. In the case of the storage-battery, the instant the electromotive force of the charging-machine falls below that of the storage-battery the latter will discharge current into the machine. To overcome this difficulty I provide an apparatus which commutates or straightens the alternating-current impulses, but collects and utilizes only that part of the pulsations of which the electromotive force is equal to or higher than that of the storage-battery or other device being operated. I also propose to make the apparatus adjustable, so that the minimum voltage collected may be changed to suit the demand.

In the drawings, Figure 1 illustrates the curve of electromotive force of an alternating-current machine; Fig. 2, the curve which would be produced by an ordinary commutator through which the alternating current is passed. Figs. 3 and 4 show the same curves as Fig. 2 with points of predetermined potential higher than zero marked thereon. Fig. 5 is a view, partly diagrammatic, showing one form of my apparatus and the circuit connections. Fig. 5$^a$ is a side view of a commutator such as indicated in Fig. 5. Fig. 6 is a similar view to Fig. 5 with a different form of commutator.

In Figs. 3 and 4 the intersections of lines R with the curves represent the electromotive force of the storage-battery to be charged or other straight-current device to be operated. The portions of said lines R which lie between adjacent curves represent intervals of time during which no current is taken off, and the portions of said lines which lie within the curves represent intervals during which the useful part of the current is taken off. The electromotive force of the pulsating current increases from O to M. During this period there is an instant (indicated at the intersection of the curves and lines R) at which the electromotive force is equal to that of the counter-current of the battery or device being operated, so that no current passes in either direction, and if the circuit be opened or closed at that instant no sparking will take place. If the counter electromotive force of the batteries to be charged or devices to be operated remained constant, a simple synchronous commutator having segments, the width of which correspond to the time interval of current-taking, and the insulating-spaces of which correspond to the time intervals when no current is taken, could be used; but the electromotive force of batteries being charged changes as the charging proceeds, rendering it necessary that the minimum voltage of the charging-current be raised. This is done by shortening the intervals of current-taking and lengthening those of non-taking, as will be readily understood by inspection of Figs. 3 and 4. As the centers of the current impulses taken off correspond in time to the highest points of the current curves, the current impulses must be taken off not only during a particular time interval, but also beginning and ending at certain definite instants, and this is accomplished by my apparatus.

In Figs. 1, 2, 3 and 4, O and M are lines of zero and of maximum potential.

In Figs. 3 and 4, R are lines indicating, respectively, potential of fifty and one hundred volts or other predetermined number.

In Figs. 5 and $5^a$, L L are commutator segments or strips radiating from a hub on a shaft 1, which may be rotated by any suitable means, but which is preferably rotated by a small alternating-current motor 2, connected to the circuit of the alternating-current generator W in multiple arc with the commutator. Machine W may be at any desired distance from the commutator and from the battery $B^\times$ to be charged or other device to be operated, and its terminals are connected to brushes bearing on the collecting-rings S S, movable with but insulated from the shaft of motor 2. One ring S is connected to each alternate strip L and the other ring to the other alternate strips, which are insulated from the first series by conductors 3 4. At diametrically-opposite points are brushes B, adapted to bear on the strips L in succession as the commutator is rotated. The brushes B, or at least one of them, are or is adjustable radially, for example, to the points $B'$ $B^2$ $B^3$. In Fig. $5^a$ the brushes are shown as adapted to slide on radial arms 5, normally held from rotation with the shaft by the worm-wheel 6 and worm 7 engaging the same, by which, however, the brushes can be adjusted circumferentially when necessary. Between strips L are spaces J, increasing in width with the distance from the shaft. The parts of all impulses which are generated while the brushes are passing over said spaces (indicated by $e$ R, Figs. 3 and 4) are not collected, as will be evident. If the brushes are at $B'$ a pulsating current will be obtained. (Indicated in Fig. 2.) If the brush is adjusted to $B^2$ or $B^3$, intermittent currents (indicated by the curves between R and M in Figs. 3 and 4) will be obtained. From brushes B extends the consumption-circuit 8, including a storage-battery $B^\times$ or other operated device.

The operation of this apparatus has already been sufficiently indicated. It will be seen that but little current will be required to drive the motor, since it has only to overcome the friction of the commutator, and, since the current is taken from the circuit of generator W, the motor (and hence the commutator) will move synchronously (or proportionally) with the generator, and the brushes will be so adjusted as to make and break contact with the strips at times when the impulse and the counter electromotive force are nearly or quite equal, as hereinbefore described.

In Fig. 6 the parts are lettered as in Fig. 5, and correspond in all respects, except that in Fig. 6 strips L are mounted longitudinally on the surface of a drum, at opposite ends of which are rings S. One series of alternate strips are connected to S on the right, and the other alternate series insulated from the first series are connected to S on the left. No means are shown for rotating this commutator and those to be hereinafter described; but it will be understood that they may be rotated by a motor, as described in connection with Fig. $5^a$, or by other suitable means. In this form the brushes are to be adjustable in the direction of the length of the strips (in the same manner as in Fig. $5^a$)—that is, longitudinally of the drum.

It is evident that the several forms of apparatus described are similar in that they are each adapted to hold the circuit open between the commutator-strips and the brushes during periods of low potential of the current pulsations and closed during periods of potential to a predetermined extent higher than zero.

Another feature common to several of the forms shown is the adjustability of one member—that is, the brushes or the commutator-strips—in such manner as to change the periods of contact between them during the regular rotation of the commutator to correspond with changes in counter electromotive force of the operated device.

While the apparatus described is designed particularly for use in the manner already indicated, it may be used also in an inverse manner—for instance, for changing the straight current of storage-battery into an alternating current for driving an alternating machine W as a motor—without departing from my invention.

Having thus described my invention, what I claim as new, and desire to secure by Letters Patent, is—

1. The combination with an alternating current machine, a straight current device, and a circuit between them, of a current straightening commutator having suitable segments and brushes interposed in said circuit, said commutator being constructed so as to hold the electrical connection between the commutator segments and the commutator brushes open while the current impulses are below a predetermined potential but higher than zero, and closed while said impulses are above such potential, substantially as set forth.

2. The combination with an alternating current machine, a straight current device, and a circuit between them, of a current straightening commutator having suitable segments and brushes interposed in said circuit, said commutator being constructed so as to hold the electrical connection between the commutator segments and the commutator brushes open while the current impulses are below a predetermined potential but higher than zero, and closed while said impulses are above such potential, and means for adjusting the periods of contact and non-contact between the segments and brushes, substantially as set forth.

3. The combination with an alternating current machine, a straight current device, and a circuit between them, of a current straightening commutator having suitable segments or strips and brushes interposed in said circuit, said commutator strips having tapering spaces between them, and the brushes being mounted so as to bear at any desired point in the length of the strips and spaces, substantially as set forth.

4. The combination, in a commutator, of radial segments or strips, connected in alternating series, strips of one series being insulated from those of the other series, the spaces between the strips increasing in width with the distance from the center or axis of the commutator, and brushes adjustable in the direction of the length of the strips, substantially as set forth.

5. The combination of an alternating current machine, a straight current device, a circuit between said machine and device, a current straightening commutator having segments separated by a considerable distance, and having also brushes of insufficient width to span the distance between adjacent segments, whereby only a part of each current impulse is collected, substantially as set forth.

In testimony whereof I have signed my name to this specification in the presence of two subscribing witnesses.

CARL POLLAK.

Witnesses:
   N. MAPISHICZ,
   R. HANACRIKZ.